(12) United States Patent
Piwonka et al.

(10) Patent No.: US 10,996,729 B2
(45) Date of Patent: May 4, 2021

(54) BALANCING A POWER LOAD AMONG USB PORTS

(71) Applicant: Hewlett-Packard Development Company, L.P., Houston, TX (US)

(72) Inventors: Mark A Piwonka, Houston, TX (US); Michael R Durham, Houston, TX (US); Nam H Nguyen, Houston, TX (US); Robert C Brooks, Houston, TX (US); Chi So, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 52 days.

(21) Appl. No.: 16/097,799

(22) PCT Filed: Jul. 12, 2016

(86) PCT No.: PCT/US2016/041847
§ 371 (c)(1),
(2) Date: Oct. 30, 2018

(87) PCT Pub. No.: WO2018/013083
PCT Pub. Date: Jan. 18, 2018

(65) Prior Publication Data
US 2019/0171267 A1    Jun. 6, 2019

(51) Int. Cl.
*G06F 1/28* (2006.01)
*G06F 1/26* (2006.01)
(Continued)

(52) U.S. Cl.
CPC .............. *G06F 1/266* (2013.01); *G06F 1/28* (2013.01); *G06F 13/38* (2013.01); *G06F 13/4282* (2013.01); *G06F 2213/0042* (2013.01)

(58) Field of Classification Search
CPC . G06F 1/266; G06F 1/28; G06F 13/38; G06F 13/4282; G06F 2213/0042;
(Continued)

(56) References Cited

U.S. PATENT DOCUMENTS 6,003,138 A    12/1999  Chung
7,159,135 B2 *  1/2007  Jacobs .................. G06F 13/423
                                                         713/400
(Continued)

FOREIGN PATENT DOCUMENTS

CN    101963835 A    2/2011
CN    102341796      2/2012
(Continued)

OTHER PUBLICATIONS

USB Power Delivery, < http://www.usb.org/developers/powerdelivery/ >.

*Primary Examiner* — Aurel Prifti
(74) *Attorney, Agent, or Firm* — Brooks Cameron & Huebsch PLLC

(57) ABSTRACT

Example implementations relate to balancing a power load among USB ports. For example, an apparatus according to the present disclosure, may include a plurality of USB ports, and an embedded controller coupled to the plurality of USB ports. The embedded controller may determine that a first device is coupled to a USB port of the plurality of USB ports, and determine a power draw of the first device relative to a type of the USB port. The embedded controller may balance a power load among a remainder of the plurality of USB ports based on the power draw of the first device relative to the type of the USB port.

13 Claims, 3 Drawing Sheets

(51) Int. Cl.
*G06F 13/38* (2006.01)
*G06F 13/42* (2006.01)

(58) Field of Classification Search
CPC .... G06F 1/3253; G06F 1/3206; G06F 13/102; G06F 13/4022; G06F 13/4072; G06F 13/4086
See application file for complete search history.

(56) References Cited

U.S. PATENT DOCUMENTS

| | | | |
|---|---|---|---|
| 7,461,273 B2 | 12/2008 | Moore et al. | |
| 7,714,534 B2* | 5/2010 | Bayne | H02J 7/0027 320/106 |
| 9,766,674 B2* | 9/2017 | Dunstan | G06F 13/385 |
| 10,234,919 B2* | 3/2019 | Daly | H04N 21/4436 |
| 2005/0229249 A1* | 10/2005 | Piwonka | G06F 21/85 726/22 |
| 2006/0190745 A1* | 8/2006 | Matsushima | G06F 1/3203 713/300 |
| 2008/0114997 A1* | 5/2008 | Chin | H04L 12/10 713/321 |
| 2008/0140565 A1* | 6/2008 | DeBenedetti | G07F 17/0014 705/39 |
| 2009/0100275 A1* | 4/2009 | Chang | H02J 7/007 713/300 |
| 2010/0077126 A1* | 3/2010 | Huang | H04L 49/101 710/316 |
| 2011/0018344 A1* | 1/2011 | Liao | G06F 1/266 307/31 |
| 2011/0273144 A1* | 11/2011 | Yu | H02J 7/00 320/162 |
| 2012/0102736 A1* | 5/2012 | Livshits | F02M 43/04 29/888.01 |
| 2013/0013936 A1* | 1/2013 | Lin | G06F 1/266 713/300 |
| 2013/0290764 A1* | 10/2013 | Taki | G06F 1/266 713/340 |
| 2014/0095899 A1* | 4/2014 | Sultenfuss | G06F 1/266 713/300 |
| 2014/0173141 A1* | 6/2014 | Waters | G06F 13/385 710/16 |
| 2015/0054451 A1* | 2/2015 | Rokusek | H02M 7/23 320/108 |
| 2015/0067374 A1* | 3/2015 | Kim | G06F 13/385 713/324 |
| 2015/0160674 A1* | 6/2015 | Burdette | G06F 13/20 700/295 |
| 2015/0248151 A1* | 9/2015 | Lim | G06F 13/4282 713/310 |
| 2015/0323979 A1* | 11/2015 | Kaestner | G06F 1/266 713/323 |
| 2016/0094071 A1* | 3/2016 | Nge | G06F 13/4022 320/107 |
| 2016/0094350 A1* | 3/2016 | Picard | G06F 1/3206 713/300 |
| 2016/0372936 A1* | 12/2016 | Agarwal | H02J 7/007 |
| 2017/0364463 A1* | 12/2017 | Chen | G06F 13/3215 |
| 2018/0046236 A1* | 2/2018 | Erturk | G06F 1/266 |
| 2018/0121373 A1* | 5/2018 | Qiu | G06F 13/4022 |
| 2018/0150127 A1* | 5/2018 | Wendt | G06F 1/266 |
| 2019/0121771 A1* | 4/2019 | Kadgi | G06F 1/1654 |

FOREIGN PATENT DOCUMENTS

| | | | |
|---|---|---|---|
| CN | 104040458 | 9/2014 | |
| CN | 104111910 | 10/2014 | |
| CN | 105706072 A | 6/2016 | |
| JP | 2001147747 | 5/2001 | |
| JP | 3156505 | 1/2010 | |
| KR | 20130014944 | 2/2013 | |
| TW | 201533578 A | 9/2015 | |
| TW | I518511 | 1/2016 | |
| TW | I545441 | 8/2016 | |
| WO | WO-2015/199880 | 12/2015 | |
| WO | WO-2016013013 A1 | 2/2016 | |
| WO | WO-2018017056 A1 * | 1/2018 | G05F 1/66 |

* cited by examiner

BALANCING A POWER LOAD AMONG USB PORTS

BACKGROUND

A computing device may include a plurality of universal serial bus (USB) ports for connection, communication, and power supply between the computing device and electronic devices. Electronic devices coupled to the computing device via a USB port may not only transmit information to and from the computing device, but may share a power supply with the computing device and therefore impact the power usage of the computing device.

DETAILED DESCRIPTION

A computing device, e.g., a system, may include a power supply that can power the device to a particular level, e.g., within a threshold power load. For example, the performance of the computing device may be unaffected if power usage remains within a particular threshold. However, the power supply may be overloaded under some conditions. For instance, the computing device may be overloaded when charging USB devices and/or when USB devices require an amount of power that results in overall system power usage exceeding the power threshold for the system. As used herein, an "overloaded" system refers to a system in which a combined power demand is greater than the rating of the power supply for the system. An overloaded system may result in decreased system performance, e.g., a throttled system, and/or shut-down of the power supply. There may be only so much system power that is allocated or budgeted for USB ports. While each USB port may individually support differing power levels, the system may not be capable of supplying full power to a plurality of USB ports simultaneously. Consequently, when a device is coupled to a USB port, it may be advantageous to balance the remaining power budgeted for a plurality of USB ports in a computing device.

Balancing a power load among USB ports, in accordance with the present disclosure, may load balance an amount of power provided to USB devices that are drawing power above an upper threshold. By balancing the power load among USB ports, an overloaded system may be avoided by ensuring that no more than one USB device will be drawing power above an upper threshold at one time. Put another way, balancing a power load among USB ports, in accordance with the present disclosure, may prevent overloading of a computing device power supply, such as when multiple USB devices are charging simultaneously, among other examples.

Figure 1:
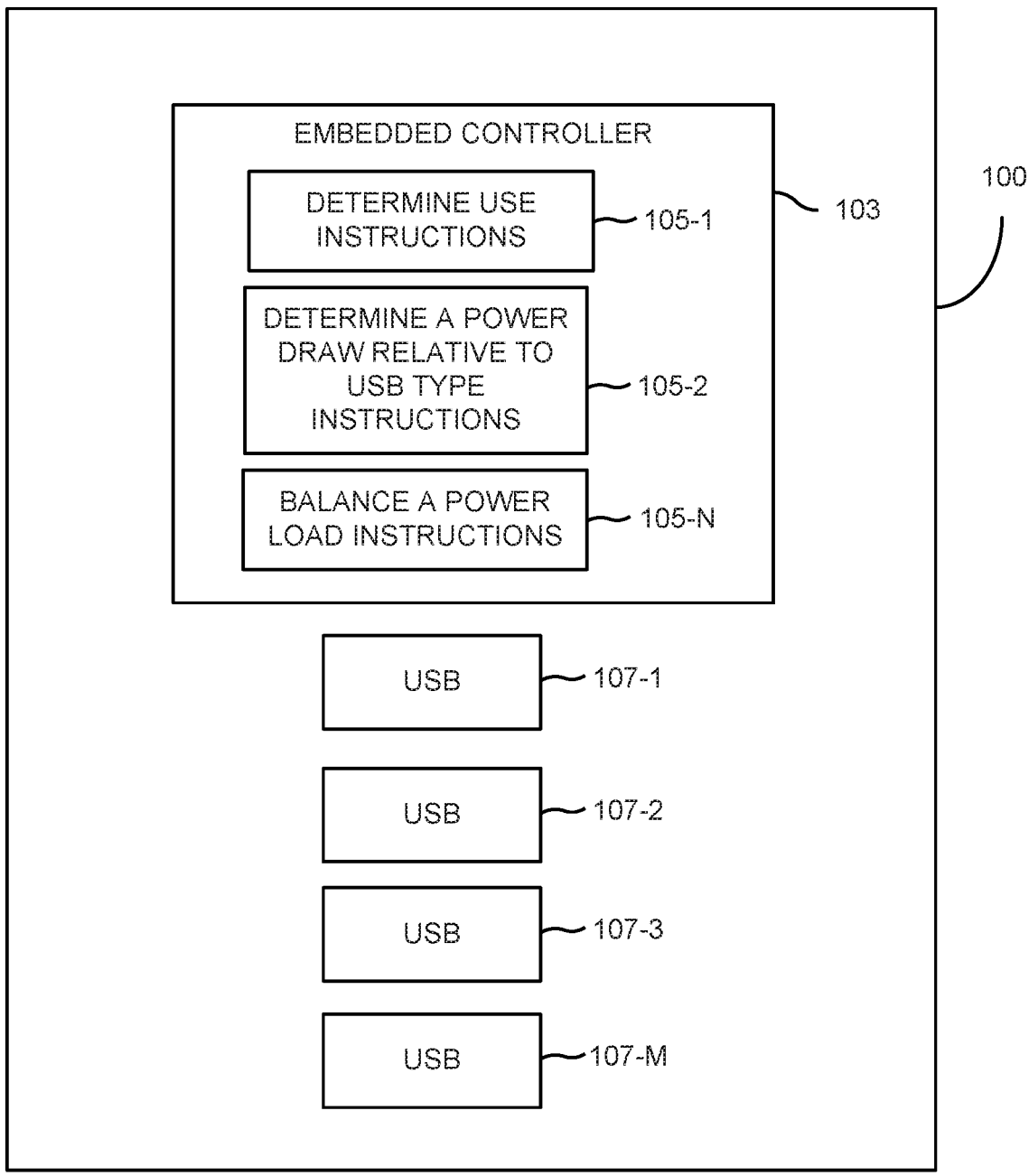
FIG. 1 illustrates a diagram of an example apparatus, for balancing a power load among USB ports, according to the present disclosure.

FIG. 1 illustrates a diagram of an example apparatus 100, for balancing a power load among USB ports, according to the present disclosure. In some examples, the apparatus 100 may be a modular computing device including a host module and a plurality of expansion modules, though examples are not so limited. As used herein, a "modular computing device" refers to a computing device comprising a plurality of user-configurable modules. As such, a modular computing device may be capable of user configuration by adding, removing, and/or altering modules.

The apparatus 100 may include a plurality of components and/or modules. For example, the apparatus 100 may include an embedded controller 103, and a plurality of USB ports 107-1, 107-2, 107-3, . . . 107-N (herein referred to collectively as "USB ports 107"). The USB ports 107 may be disposed in various locations within apparatus 100, such as on a host module, and/or on a plurality of expansion modules (not illustrated in FIG. 1). Put another way, apparatus 100 may include any number of different USB ports, each of which may be disposed on any number of different components within apparatus 100. Also, while USB ports 107 are illustrated in FIG. 1 as being vertically aligned, examples are not so limited, and the USB ports 107 may assume any configuration within apparatus 100.

The embedded controller 103 may be coupled to the plurality of USB ports 107. As used herein, an "embedded controller" refers to a hardware device in apparatus 100 that controls a specific set of functions of the apparatus 100. The apparatus 100 may also include a basic input/output system (BIOS), among other components, which may be communicatively coupled to the embedded controller 103.

The embedded controller 103, individually or in combination with the BIOS, may perform a number of different functions of the apparatus 100, relating to balancing a power load among USB ports. That is, the embedded controller 103 may balance a power load among USB ports 107, or the embedded controller 103 and the BIOS of apparatus 100 collectively may balance the power load among the USB ports 107. As such, the embedded controller 103 may determine that a first device is coupled to one USB port of the plurality of USB ports. For instance, the embedded controller 103 may determine that a device is coupled to USB port 107-1. In another example, the embedded controller 103 may determine that a plurality of devices are coupled to a plurality of the USB ports 107. For instance, devices may be coupled to USB ports 107-1, 107-3, and 107-M, among other examples.

The embedded controller 103 may also determine a power draw of the first device relative to a type of a USB port being used. For instance, the embedded controller 103 may determine that a device is coupled to USB port 107-1. The embedded controller 103, alone or in combination with the system BIOS, may determine that USB port 107-1 is a type-A USB port. Many different types of USB ports may be used, and each type of USB port may have a different shape, power capacity, and/or other configuration. For instance, type-A USB ports may support discrete amounts of power to a device such as 2.5 watts (W), 4.5 W, 7.5 W, 12.5 W, and 15 W. In contrast, type-C USB ports may support many different amounts of power. For instance, a type-C USB port may support power supplies ranging from 0-15 W by default, and in some instances may support power supplies up to 100 W. As such, based on the type of USB port (e.g., type-A versus type-C), each USB port may supply a different threshold amount of power to a device. Moreover, a device that is coupled to the USB port and drawing power may use differing amounts of power. For instance, if USB port 107-1 were a type-A USB port, a device coupled to USB port 107-1 may draw 7.5 W of power while the device is charging and 2.5 W of power while the device is not charging. In another example, if USB port 107-2 were a type-C USB port, a device coupled to USB port 107-2 may draw up to 15 W of power by default, and in some instances up to 100 W of power. As such, each of the USB ports 107 may have a particular power threshold indicating a maximum amount of power that may be supplied by that particular USB port, based on the type of USB port. As described herein, the apparatus 100 may balance the remaining power amongst the remaining USB ports 107.

To illustrate, the embedded controller 103, alone or in combination with the BIOS of apparatus 100, may detect that a device is coupled to a USB port among the plurality of USB ports 107, and determine that the device is requesting charging or high wattage output. That is, the embedded controller 103 and/or BIOS may determine that the device is requesting a power draw that meets or exceeds a particular power threshold, corresponding to a maximum amount of power supply supported by the type of USB port. For instance, it may be determined that a device coupled to a type-A USB port is requesting a maximum of 15 W of power, or that a device coupled to a type-C USB port is requesting a maximum of 100 W of power. In response to the determination that the device is requesting charging or high wattage output, the power supplied to the remaining USB ports 107 may be reduced. In such a manner, a total allocation of power for the plurality of USB ports 107 may be maintained at or below a particular level. Put another way, by balancing a power load among the plurality of USB ports 107, the apparatus 100 may ensure that no more than one USB port among the plurality of USB ports 107 may be charging or drawing high wattage output at a particular point in time. As described herein, this behavior may be controlled by the system BIOS through the embedded controller 103, or by the embedded controller 103 alone with appropriate instructions to control the power levels for each USB port.

As described herein, the embedded controller 103 may determine a power draw of a first device relative to the type of USB port to which it is coupled. Put another way, the embedded controller 103 may determine that the first device is requesting charging or high wattage use. The embedded controller 103 (alone or in combination with system BIOS) may balance a power load among the plurality of USB ports based on the power draw of the first device relative to the type of the USB port. That is, the embedded controller 103 may balance the power load among the plurality of USB ports based on a determination that a device coupled to one of the USB ports 107 is requesting charging or high wattage use.

To illustrate, the embedded controller 103 may determine that a device is coupled to a USB port 107-1. The embedded controller 103 may determine that USB port 107-1 is a type-A USB port, and further determine if the first device is requesting a power supply exceeding a particular amount relative to a power capacity of the type-A USB port. For instance, if the upper threshold, e.g., maximum, power capacity of the type-A USB port is 15 W, the embedded controller 103 may determine if the device is requesting 15 W of power from USB port 107-1. In response to the determination that the device coupled to USB port 107-1 is requesting power at the upper threshold capacity for the type of USB port, the embedded controller, with or without the BIOS, may balance the amount of power provided to the remainder of the USB ports, e.g., 107-2, 107-3, and 107-M.

In another illustration, the system BIOS and the embedded controller 103, may determine that a device is coupled to one of the USB ports, e.g., 107-1, and that the USB port is a type-C USB port. Further, the system BIOS and the embedded controller 103, may determine if the device is requesting a power supply exceeding a particular amount relative to a power capacity of the type-C USB port. That is, if the type-C USB port can support power supplies up to 100 W, then the embedded controller 103 (with or without BIOS) may determine if the device coupled to the type-C USB port exceeds a particular threshold, such as 75 W. In response to determining that the device coupled to USB port 107-1, is requesting more than a threshold level of power, the embedded controller 103 may balance the power supplied to the remainder of the USB ports, e.g., 107-2, 107-3, and 107-M.

Notably, while reference is made herein to the embedded controller 103 determining power usage among the USB ports 107 and balancing the power among the USB ports 107, it should be noted that examples are not so limited. For instance, the BIOS of apparatus 100 may determine power usage among the USB ports 107, and instruct the embedded controller 103 in balancing the power among the USB ports 107.

To illustrate further, the embedded controller 103 may determine that a device is coupled to USB port 107-1, and that said device is requesting charging or high wattage use. The embedded controller 103 may further determine a power draw of devices coupled devices coupled to a remainder of the plurality of USB ports, e.g., 107-2, 107-3, and 107-M, based on a type of the remainder of the USB ports. That is, the type of USB ports 107-2, 107-3, and 107-M may be determined and/or known. Based on the type of the USB port, the embedded controller 103 may determine if the remainder of the USB ports are requesting charging or high wattage use. Based on the determination of how many devices are coupled to the apparatus, via USB ports 107, what amount of power each device is requesting, and what the type of each USB port is, the embedded controller 103 may balance the power load provided to all of the USB ports 107 such that the power load provided to the plurality of USB ports does not exceed a particular allocation of power.

In some examples, the embedded controller 103 may determine that a first device is no longer requesting charging or high wattage use, and balance the power load accordingly. For instance, if a device were coupled to USB port 107-3, and requesting charging, the embedded controller 103 may determine when the device is no longer requesting charging, and therefore has a reduced power draw. In such examples, the embedded controller 103 may reallocate the power supplied to the remainder of the USB ports 107. For instance, the embedded controller 103 may increase an amount of power provided to a second USB port, such as USB port 107-2, in response to the determination that the first device, e.g., coupled to USB port 107-3, is no longer requesting charging or high wattage use.

Figure 2:
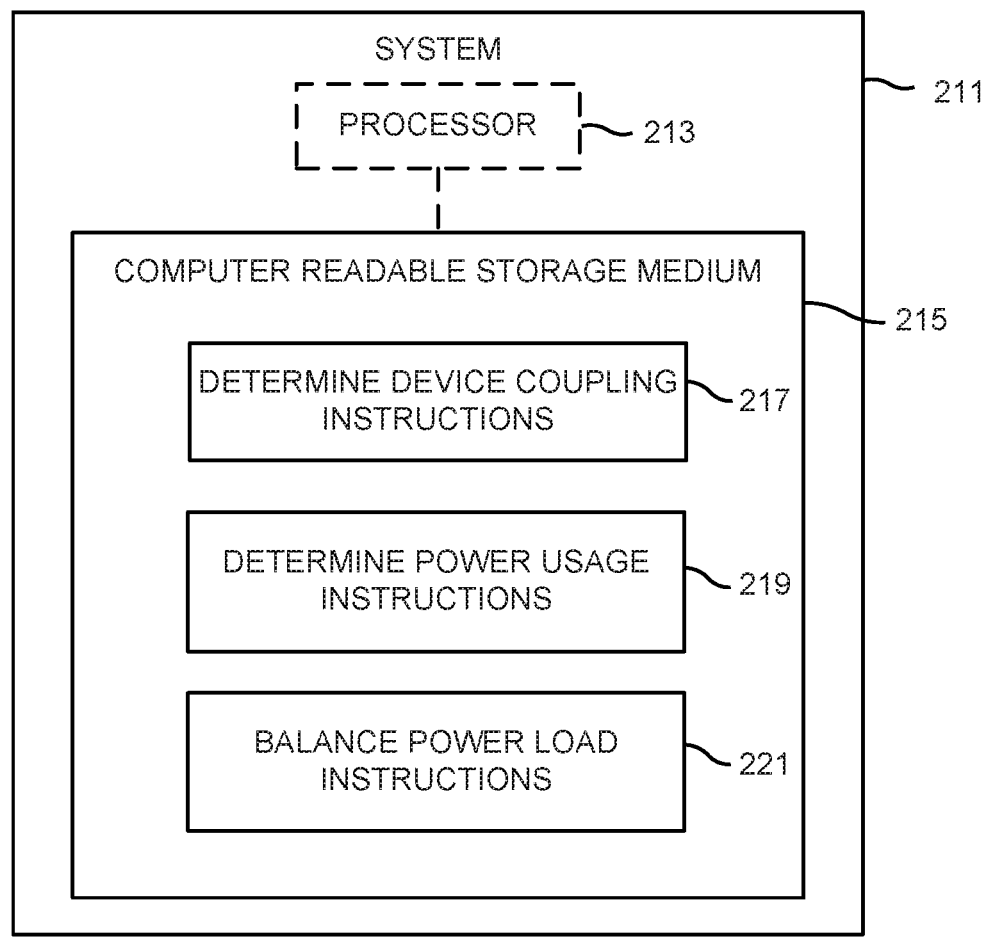
FIG. 2 is a block diagram of an example system for balancing a power load among USB ports, according to the present disclosure.

FIG. 2 is a block diagram of an example system 211 for balancing a power load among USB ports, according to the present disclosure. System 211 may include at least one computing device that is capable of communicating with at least one remote system. In the example of FIG. 2, system 211 includes a processor 213 and a computer-readable storage medium 215. Although the following descriptions refer to a single processor and a single computer-readable storage medium, the descriptions may also apply to a system with multiple processors and multiple computer-readable storage mediums. In such examples, the instructions may be distributed (e.g., stored) across multiple computer-readable storage mediums and the instructions may be distributed (e.g., executed by) across multiple processors.

Processor 213 may be a central processing unit (CPU), a semiconductor based microprocessor, and/or other hardware devices suitable for retrieval and execution of instructions stored in computer-readable storage medium 215. Processor 212 may fetch, decode, and execute instructions 217, 219, 221, or a combination thereof. As an alternative or in addition to retrieving and executing instructions, processor 213 may include at least one electronic circuit that includes electronic components for performing the functionality of instructions 217, 219, 221, or a combination thereof.

Computer-readable storage medium 215 may be any electronic, magnetic, optical, or other physical storage device that stores executable instructions. Thus, computer-readable storage medium 215 may be, for example, Random Access Memory (RAM), an Electrically-Erasable Programmable Read-Only Memory (EEPROM), a storage drive, an optical disc, etc. In some examples, computer-readable storage medium 215 may be a non-transitory storage medium, where the term "non-transitory" does not encompass transitory propagating signals. Computer-readable storage medium 215 may be encoded with a series of processor executable instructions 217, 219, and 221.

Referring to FIG. 2, the determine device coupling instructions 217, when executed by a processor (e.g., 212), may cause system 211 to determine that a first device is coupled to a first universal serial bus (USB) port among a plurality of USB ports.

The determine power usage instructions 219, when executed by a processor (e.g., 213), may cause system 211 to determine that the first device is requesting charging or high wattage use. In some examples, the instructions to determine that the first device is requesting charging or high wattage use may include instructions to determine a type of the first USB port, and determine a particular power output threshold of the first USB port based on the type of USB port. As used herein, a power output threshold refers to an upper limit, or maximum, amount of power which may be output from a particular device, such as a USB port. As described in relation to FIG. 1, different types of USB ports may have different upper thresholds of power which may be output from the USB port. As such, the determine power usage instructions 219 may include instructions to determine that the first device is requesting an amount of power equivalent to the determined particular power output threshold of the USB port.

The balance power load instructions 221, when executed by a processor (e.g., 213), may cause system 211 to balance a power load among the plurality of USB ports based on the determination that the first device is requesting charging or high wattage use. The instructions to balance the power load include instructions to: reduce an amount of power provided to a remainder of the plurality of USB ports such that the power load of the plurality of USB ports does not exceed a particular allotted load reserved for the plurality of USB ports.

Figure 3:
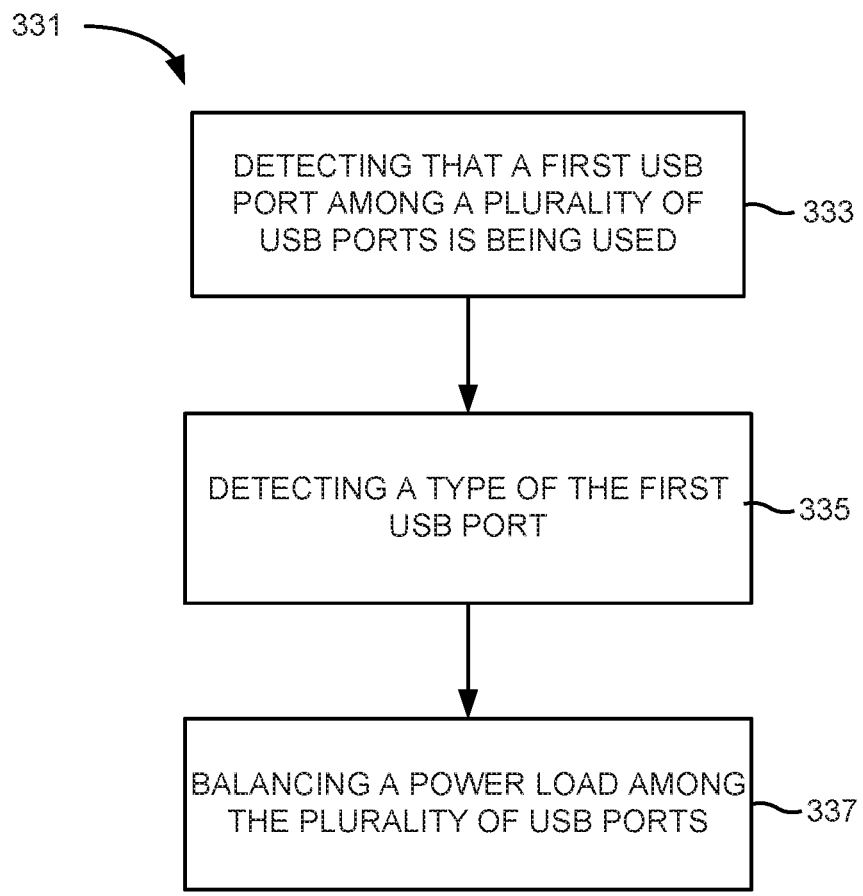
FIG. 3 illustrates an example method for balancing a power load among USB ports, according to the present disclosure.

FIG. 3 illustrates an example method 331 for balancing a power load among USB ports, according to the present disclosure. At 333, the method 331 may include determining that a first device is coupled to a first USB port among a plurality of USB ports on a modular computing device, and a second device is coupled to a second USB port among the plurality of USB ports. For example, as illustrated in FIG. 1, it may be determined that a device is coupled to USB port 107-1, and another device is coupled to USB port 107-2.

At 335, the method 331 may include determining that the first device and the second device are requesting charging or high wattage use. As discussed in relation to FIG. 1, determining whether a device is requesting charging or high wattage use is dependent on the type of the USB port, and the power supplies supported. As such, the method 331 may include determining a type of the first USB port, where determining that the first device is requesting charging or high wattage use includes determining that the first device is requesting charging or high wattage use based on the determined type of the first USB port.

At 337, the method 331 may include balancing a load among the plurality of USB ports based on the determination that the first device and the second device are requesting charging or high wattage use. As described herein, the apparatus 100 illustrated in FIG. 1, and the system 211 illustrated in FIG. 2, may ensure that no more than one USB port is providing charging or high wattage use to a device at any given point in time. As such, the method 331 may include providing an upper threshold amount of power, e.g., a maximum amount of power supported by the type of USB port, to a first USB port, and providing a lower threshold amount of power, e.g., less than a maximum amount of power supported by the type of USB port, to the remainder of the USB ports.

That is, the method 331 may include detecting that a first device is coupled to a first USB port, e.g., 107-1, a second device is coupled to a second USB port, e.g., 107-2, and a third device is coupled to a third USB port, e.g., 107-3. The method 331 may include determining that all three devices are requesting charging or high wattage use, and balancing a power load among the plurality of USB ports, such that one USB port among the three is able to provide maximum power to the coupled device.

Balancing a power load, as described herein, may be dynamic, in that the allocation among the USB ports may change based on the power demands of each respective USB port. That is, the method 331 may include determining that particular device is no longer requesting charging or high wattage use. In such an example, balancing the power load may include increasing an amount of power provided to a remainder of the USB ports based on the determination that the particular device is no longer requesting charging or high wattage use. For instance, referring to FIG. 1, in response to a determination that a device coupled to USB port 107-1 is no longer requesting charging or high wattage use, the power supplied to USB port 107-2 may be increased. In such a manner, balancing the power load among the plurality of USB ports may include ensuring that one USB port is drawing power at a maximum level, based on the type of USB port, at a given time.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N" and "M", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. An apparatus comprising:
   a plurality of universal serial bus (USB) ports; and
   an embedded controller coupled to the plurality of USB ports, the embedded controller to:
   determine that a first device is coupled to a USB port of the plurality of USB ports;
   determine a power draw of the first device relative to a type of the USB port;
   determine a power draw of devices coupled to a remainder of the plurality of USB ports based on a type of the remainder of the plurality of USB ports; and
   balance a power load among the remainder of the plurality of USB ports based on the power draw of the first device relative to the type of the USB port, wherein to balance the power load is to reduce an amount of power provided to the remainder of the plurality of USB ports such that the power load provided to the plurality of USB ports does not exceed a particular allocation of power.

2. The apparatus of claim 1, wherein to determine the power draw of the first device relative to a type of the USB port includes the embedded controller to:
   determine that the USB port is a type-A USB port; and
   determine when the first device is requesting a power supply exceeding a particular amount relative to a power capacity of the type-A USB port.

3. The apparatus of claim 1, wherein to determine the power draw of the first device relative to a type of the USB port includes the embedded controller to:
   determine that the USB port is a type-C USB port; and
   determine when the first device is requesting a power supply exceeding a particular amount relative to a power capacity of the type-C USB port.

4. The apparatus of claim 1, the embedded controller:
   determine that the first device is no longer coupled to the USB port;
   wherein to balance the power load is to increase an amount of power provided to a second USB port in response to the determination that the first device is no longer coupled to the USB port.

5. The apparatus of claim 1, the embedded controller to:
   determine that the first device is no longer coupled to the USB port;
   wherein to balance the power load is to increase an amount of power provided to the remainder of the plurality of USB ports in response to the determination that the first device is no longer coupled to the USB port.

6. The apparatus of claim 1, wherein to determine a power draw of the first device relative to a type of the USB port includes the embedded controller to:
   determine that the first device is requesting a particular amount of power supported by the USB port, based on the type of the USB port.

7. A non-transitory computer-readable storage medium containing instructions that when executed cause a processor of a computing device to:
   determine that a first device is coupled to a first universal serial bus (USB) port among a plurality of USB ports;
   determine that the first device is requesting charging or high wattage use from a host module; and
   balance a power load among the plurality of USB ports based on the determination that the first device is requesting charging or high wattage use by:
   providing an upper threshold amount of power to the first USB port; and
   providing a lower threshold amount of power to a remainder of the plurality of USB ports.

8. The medium of claim 7, wherein the instructions to determine that the first device is requesting charging or high wattage use include instructions to:
   determine a type of the first USB port;
   determine a power output threshold of the first USB port based on the type of the first USB port; and
   determine that the first device is requesting an amount of power meeting the determined power output threshold.

9. The medium of claim 7, wherein the instructions to balance the power load include instructions to:
   reduce an amount of power provided to a remainder of the plurality of USB ports such that the power load of the plurality of USB ports does not exceed a particular allotted load reserved for the plurality of USB ports.

10. A method comprising:
    determining that a first device is coupled to a first universal serial bus (USB) port among a plurality of USB ports on a modular computing device, and a second device is coupled to a second USB port among the plurality of USB ports;
    determining that the first device and the second device are requesting charging or high wattage use; and
    balancing a power load among the plurality of USB ports based on the determination that the first device and the second device are requesting charging or high wattage use by:
    providing an upper threshold amount of power to the first USB port; and
    providing a lower threshold amount of power to a remainder of the plurality of USB ports, wherein the remainder includes the second USB port.

11. The method of claim 10, further including:
    determining a type of the first USB port and the second USB port;
    wherein determining that the first device is requesting charging or high wattage use includes determining that the first device is requesting charging or high wattage use based on the determined type of the first USB port; and
    wherein determining that the first device is requesting charging or high wattage use includes determining that the first device is requesting charging or high wattage use based on the determined type of the first USB port.

12. The method of claim 10, further comprising:
    determining that a third device is coupled to a third USB port among the plurality of USB ports; and
    determining that the third device is requesting charging or high wattage use;
    wherein balancing the power load among the plurality of USB ports includes providing an upper threshold amount of power to the third USB port and providing a lower threshold amount of power to the first USB port and the second USB port.

13. The method of claim 10, further comprising:
    determining that the first device is no longer requesting charging or high wattage use;
    wherein balancing the load includes increasing an amount of power provided to the second USB port based on the determination that the first device is no longer requesting charging or high wattage use.

* * * * *